May 22, 1951  A. PASQUALE  2,554,055
PINLOCK
Filed Feb. 17, 1948

INVENTOR.
Arthur Pasquale
BY
Attorney

Patented May 22, 1951

2,554,055

UNITED STATES PATENT OFFICE 2,554,055

PINLOCK

Arthur Pasquale, Providence, R. I., assignor to Coro, Inc., a corporation of Rhode Island Application February 17, 1948, Serial No. 8,869

3 Claims. (Cl. 24—158)

The present invention relates to the jewelry art, and has particular reference to a pin catch construction for brooches, ornament pins and the like.

The principal object of the invention is to provide an automatic self-closing pin lock.

An additional object of the invention is to provide a pin lock with a movable catch which is shifted to lock position by closing movement of the pin.

A further object is to provide a pin lock which cannot inadvertently release the pin and requires manual operation to open the catch.

Another object of the invention is to provide a pin lock with a manually slidable catch which ejects the pin from the lock on manual shifting of the catch to pin release position.

Another object of the invention is to provide a pin lock with a sliding latch having a cam edge engageable by a pin moved into closed position for shifting the sliding latch to locking position, the unlocking being accomplished by manually shifting the sliding latch back to release the pin and eject it from the pin lock.

An additional object of the invention is to provide a novel pin lock which is made of two stamped elements which are readily assembled.

With the above and other objects and advantageous features in view, the invention consists of a novel arrangement of parts more fully disclosed in the detailed description following, in conjunction with the accompanying drawings, and more specifically defined in the claims appended thereto.

It has been found desirable to provide a pin lock for a brooch, an ornament pin, or the like, which has a small number of readily manufactured and mounted parts and operates to automatically lock an inserted pin. To this end, I provide a pin base which may be secured to an ornament back by soldering or riveting, and which has a pin receiving slot; and I slidably mount a catch on the base which is movable between a lock and a release position, the catch having a cam edge which is engaged by a pin inserted in the base slot to slide the catch so as to close the base slot. In this lock position the catch is releasably retained in place against inadvertent opening, but may be manually shifted to release position, the pin being released and ejected from the base slot by the cam edge, and the slide catch being releasably retained in release position to again receive the pin when it is again inserted into the pin lock.

Figure 8:
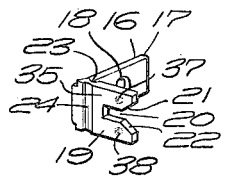
Fig. 8 is a perspective view of the pin lock base.

Referring to the drawings, the illustrative bar pin 10 includes an ornament element 11, a pin 12 pivotally mounted in a support 13 of standard type, and a pin lock 14 adapted to receive the pin end 15 of the pin 12. The pin lock 14 is of the snap type and includes a base 16, see Fig. 8, which has a lower portion 17, preferably in the form of a flat plate adapted to be soldered or otherwise secured to the back of an ornament, and provided with an opening 18 for receiving solder, and an upstanding portion 19 at right angles to the lower portion and provided with a pin receiving slot 20 having beveled inlet guide surfaces 21, 22.

Figure 7:
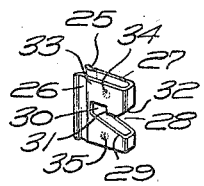
Fig. 7 is a perspective view of the slide catch.

The upstanding portion 19 has aligned transverse grooves 23, 24 at the lower end thereof, to receive correspondingly ribbed or indented lower ends 25, 26 of a slide 27 of resilient material which is generally U-shaped in section and of greater width than the upstanding portion. The slide 27 is slotted to provide a pin inlet opening 28 having an inclined cam edge 29 forming one side, the other side having a rectangular recess 30 at its inner end, with a front wall shaped as a closure or block tooth 31 which extends over the upper end of the recess, with its upper portion inclined as indicated at 32, see Fig. 7. The inclined tooth portion 32 is preferably of the same inclination as the associated beveled slot guide surface 21, and the cam edge or side 29 is of less inclination than its associated slot guide surface 22; one surface 33 of the slide is provided with spaced dents or projections 34, 35, and the associated side 36 of the upstanding portion 19 of the base is provided with spaced depressions 37, 38 adapted to selectively snap receive the spaced dents 34, 35 of the slide, but of closer adjacency for the purpose hereinafter described.

Figure 1:
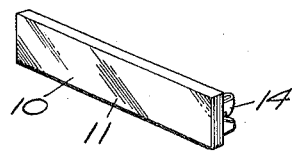
Fig. 1 is a perspective view of an illustrative ornament in the form of a bar brooch, equipped with the novel pin lock.
Figure 2:
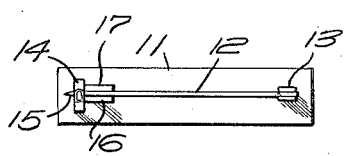
Fig. 2 is a rear view thereof.
Figure 3:
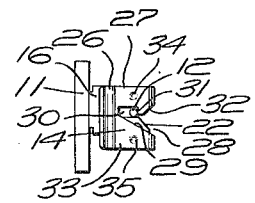
Fig. 3 is an enlarged end view thereof, the pin lock parts being shown in locked position.
Figure 4:
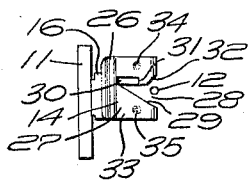
Fig. 4 is a view similar to Fig. 3, the pin lock parts being shown in pin receiving position.

When the lower portion 17 of the base is secured to an ornament back the upstanding portion 19 extends outwardly with its slot 20 in the path of closing movement of the pin end 15. The slide 27 is normally positioned with its inlet 28 in alignment with the slot inlet, the projection 35 of the slide being engaged with the depression 38, as illustrated in Fig. 4. In this position which is the pin receiving position for the slide, the cam side 29 extends diagonally over the slot guide surface 22 and the pin end can freely enter.

Figure 5:
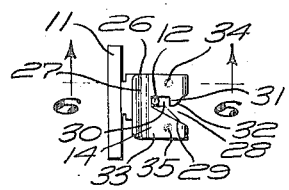
Fig. 5 is a view similar to Fig. 4, the pin lock parts being shown at the completion of the pin receiving movement.
Figure 6:
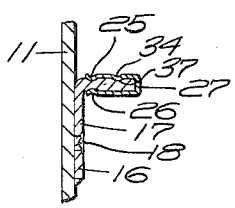
Fig. 6 is an enlarged section on the line 6—6 of Fig. 5.

As the pin end 15 enters and passes into the slot 20 it engages the cam side 29 and shifts the slide to the pin locking position shown in Fig. 5, to align the slide recess and the lower end of the slot, and to simultaneously extend the tooth 31 over the slot and thus lock the pin end in the lower portion of the slot. In this position of the slide the projection 34 snaps into the depression 37 to releasably lock the slide in pin locking position.

To release the pin, the slide 27 is manually shifted to its initial position; the tooth 31 moves to open the upper end of the slot, and the cam side 29 thrusts the pin end outwardly and ejects it from the slot. The projection 35 now seats in the depression 38 and the pin catch lock is again in pin receiving position.

Although it is preferred to set the pin lock with its slot in alignment with the line of the pin, the parts may be set slightly out of alignment so that the pin is under slight tension when it is in locked position. Pressing of the slide to release and eject the pin end thus relieves the pin tension and causes the pin to snap out when ejected.

The invention has been described and illustrated as applied to a pin catch, but may be readily adapted for use as a door, cupboard, or gate lock, or the like, to releasably lock receive a bar, and the size, shape and arrangement of the parts may be changed to adapt the lock to different jewelry and other uses, without departing from the spirit and the scope of the invention as defined in the appended claims.

I claim:

1. A snap lock for a pin, comprising a base having an upstanding portion provided with a pin receiving slot having bevelled inlet guide surfaces, said upstanding portion having aligned slide grooves on the sides thereof, and a U-shaped slide mounted on the upstanding portion and having aligned ribs slidably seated in said slide grooves and movable across said slot, said slide being of greater length than the upstanding portion and having a pin receiving opening including an inclined cam edge forming one side thereof, the other side having a recess at its inner end and a tooth forming the outer wall of the recess and extending towards the inclined cam edge, said inclined cam edge extending diagonally across the slot when the slide and its opening are in pin receiving position, whereby entry of a pin into the slot engages the pin with the inclined cam edge to move the slide to pin locking position, said movement aligning the recess with the inner end of the slot and extending the tooth across the outer end of the slot.

2. A snap lock for a pin, comprising a base having an upstanding portion provided with a pin receiving slot having bevelled inlet guide surfaces, said upstanding portion having aligned slide grooves on the sides thereof, and a U-shaped slide mounted on the upstanding portion and having aligned ribs slidably seated in said slide grooves and movable across said slot, said slide being of greater length than the upstanding portion and having a pin receiving opening including an inclined cam edge forming one side thereof, the other side having a recess at its inner end and a tooth forming the outer wall of the recess and extending towards the inclined cam edge, said inclined cam edge extending diagonally across the slot when the slide and its opening are in pin receiving position, whereby entry of a pin into the slot engages the pin with the inclined cam edge to move the slide to pin locking position, said movement aligning the recess with the inner end of the slot and extending the tooth across the outer end of the slot, and means for releasably retaining the slide in pin receiving and in pin locking position.

3. A snap lock for a pin, comprising a base having an upstanding portion provided with a pin receiving slot having bevelled inlet guide surfaces, said upstanding portion having aligned slide grooves on the sides thereof, and a U-shaped slide mounted on the upstanding portion and having aligned ribs slidably seated in said slide grooves and movable across said slot, said slide being of greater length than the upstanding portion and having a pin receiving opening including an inclined cam edge forming one side thereof, the other side having a recess at its inner end and a tooth forming the outer wall of the recess and extending towards the inclined cam edge, said inclined cam edge extending diagonally across the slot when the slide and its opening are in pin receiving position, whereby entry of a pin into the slot engages the pin with the inclined cam edge to move the slide to pin locking position, said movement aligning the recess with the inner end of the slot and extending the tooth across the outer end of the slot, and means for releasably retaining the slide in pin receiving and in pin locking position, said means including cooperating snap engaging parts on the slide and the upstanding member.

ARTHUR PASQUALE.

REFERENCES CITED

The following references are of record in the file of this patent:

UNITED STATES PATENTS

| Number | Name | Date |
| --- | --- | --- |
| 1,201,175 | Grunwald | Oct. 10, 1916 |
| 1,321,621 | Goozey | Nov. 11, 1919 |
| 1,490,338 | Myers | Apr. 15, 1924 |
| 1,546,697 | Young | July 21, 1925 |
| 2,330,789 | Chiappinelli | Sept. 28, 1943 |

FOREIGN PATENTS

| Number | Country | Date |
| --- | --- | --- |
| 10,169 | Great Britain | of 1906 |